United States Patent
Mitsugi

(10) Patent No.: US 7,269,789 B2
(45) Date of Patent: Sep. 11, 2007

(54) DOCUMENT INFORMATION PROCESSING APPARATUS

(75) Inventor: Tatsuya Mitsugi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 385 days.

(21) Appl. No.: 10/806,092

(22) Filed: Mar. 23, 2004

(65) Prior Publication Data

US 2004/0205670 A1    Oct. 14, 2004

(30) Foreign Application Priority Data

Apr. 10, 2003   (JP)   .............................. 2003-106878

(51) Int. Cl.
*G06F 15/00* (2006.01)

(52) U.S. Cl. ................... 715/513; 715/500; 715/500.1; 715/530; 715/532

(58) Field of Classification Search ............ 715/500.1, 715/513, 532, 500, 530
See application file for complete search history.

(56) References Cited

U.S. PATENT DOCUMENTS

| | | | | |
|---|---|---|---|---|
| 5,848,415 A | * | 12/1998 | Guck ........................... 707/10 |
| 6,581,056 B1 | * | 6/2003 | Rao ............................... 707/5 |
| 6,635,089 B1 | * | 10/2003 | Burkett et al. ............... 715/513 |
| 6,748,569 B1 | * | 6/2004 | Brooke et al. ............... 715/523 |
| 7,020,685 B1 | * | 3/2006 | Chen et al. .................. 709/204 |
| 2001/0044811 A1 | * | 11/2001 | Ballantyne et al. ......... 707/513 |
| 2003/0023634 A1 | * | 1/2003 | Justice et al. ............... 707/517 |
| 2004/0054654 A1 | * | 3/2004 | Nomiyama et al. ............ 707/1 |
| 2004/0093217 A1 | * | 5/2004 | Yeh et al. ................. 704/270.1 |
| 2004/0230898 A1 | * | 11/2004 | Blakely et al. .............. 715/513 |
| 2005/0049852 A1 | * | 3/2005 | Chao ............................. 704/9 |
| 2005/0131935 A1 | * | 6/2005 | O'Leary et al. ............ 707/102 |

FOREIGN PATENT DOCUMENTS

| | | |
|---|---|---|
| JP | 10-097286 A | 4/1998 |
| JP | 2001-67355 A | 3/2001 |
| WO | WO-02/27524 A2 | 4/2002 |

* cited by examiner

*Primary Examiner*—Doug Hutton
*Assistant Examiner*—Chau Nguyen
(74) *Attorney, Agent, or Firm*—Birch, Stewart, Kolasch & Birch, LLP

(57) ABSTRACT

A document information processing apparatus includes a form element analyzer (12) for performing a form element analysis on a plain document inputted from a plain document input unit (10) by using a dictionary stored in a dictionary storage unit so as to decompose the plain document into tokens, a syntax analyzer (13) for analyzing the part of speech of each of the tokens obtained by the form element analyzer so as to generate a structured document containing meaningful words, an element refinement processing unit (15) for performing a markup process of adding data associated with each of the meaningful words included in the structured document generated by the syntax analyzer and stored in a data storage unit (14) to each of the meaningful words so as to generate a markup document, and a markup document output unit (17) for outputting the markup document generated by the element refinement processing unit.

21 Claims, 7 Drawing Sheets

DOCUMENT INFORMATION PROCESSING APPARATUS

BACKGROUND OF THE INVENTION

1. Field of the Invention

The present invention relates to a document information processing apparatus, and, more particularly, to a technology for, when each word or copula included in a document has a meaning, adding information indicating the meaning or contents of each word or copula to each word or copula.

2. Description of Related Art

Conventionally, as a technology for automatically classifying individual words currently used in text data by statistically processing the individual words, a technology for giving a token to each sequence of word classes having a probability of appearing in the text data that is equal to or higher than a predetermined value, dividing each of sets in which words and tokens coexist, the sets being contained in a sequence of words and tokens of the text data so that the probability of generation of sequences of words and tokens of the text data is maximized, replacing each token with a copula that exists in the text data, and automatically classifying both words and copulas together is known (see Japanese patent application publication (TOKKAIHEI) No. 10-97286, for example).

For a system that summarizes a huge volume of document information, converts them into expressions that are easy to catch by voice, converts documents written in a spoken language into written words that are easy to read, and extracts important component (i.e., characteristic expressions), such as the names of persons and places, the names of organizations, dates, etc. from newspaper articles and so on, a technology for making it possible to declaratively and simply define a rewriting rule including restrictions on character strings and a rule governing the extraction of characteristic expressions without concern for the order of processes is known (see Japanese patent application publication (TOKKAI) No. 2001-67355, for example). In accordance with this technology, a set of rewriting rules described by users is converted into a set of rules governing a grammar of definite clauses by a translation device, and the set of rules governing the grammar of definite clauses is then converted into an integrated rule that can be processed in parallel and at a high speed by a rule integration device. A rewriting execution device then accepts the integrated rule and a document (i.e., an original document) that should be changed, and outputs the changed result.

However, the prior art technologies disclosed by Japanese patent application publication (TOKKAIHEI) No. 10-97286 and Japanese patent application publication (TOKKAI) No. 2001-67355 automatically classifies words and copulas included in a document at the best, but cannot express even the meaning or contents which each word or copula included in the document has.

As communication technologies and information control technologies have been developed in recent years, various types of information equipment terminals frequently perform an exchange of alphabetic information, which is represented by an exchange of an e-mail and browsing of homepages at different places and at different times. However, the interpretation of each word or copula contained in the alphabetic information is carried out based on a human being's memory and judgment. Therefore there are some cases where due to a lapse of judgment of the context or syntax of the alphabetic information and a lapse of memory, the provider of the alphabetic information and the receiver of the alphabetic information differently understand the meaning and contents of the alphabetic information, so that the provider cannot smoothly provide his or her intention to the receiver by using the alphabetic information.

SUMMARY OF THE INVENTION

The present invention is made to solve the above problems and it is therefore an object of the present invention to provide a document information processing apparatus that can surely inform users of the meaning and contents of a target document.

In accordance with the present invention, there is provided a document information processing apparatus including: a plain document input unit for inputting a plain document; a dictionary storage unit for storing a dictionary used for form element analysis and syntactic analysis; a form element analyzer for performing a form element analysis on the plain document inputted from the plain document input unit by using the dictionary stored in the dictionary storage unit so as to decompose the plain document into tokens; a syntax analyzer for analyzing a part of speech of each of the tokens obtained by the form element analyzer based on a syntax of the plain document so as to generate a structured document containing meaningful words; a data storage unit for storing data used for a markup process; an element refinement processing unit for performing the markup process of reading and adding data associated with each of the meaningful words included in the structured document generated by the syntax analyzer and stored in the data storage unit to each of the meaningful words so as to generate a markup document; and a markup document output unit for outputting the markup document generated by the element refinement processing unit.

As mentioned above, in accordance with the present invention, the document information processing apparatus decomposes a piece of alphabetic information or a document into words and can classify each of these words according to its part of speech. Then the document information processing apparatus can automatically add the meaning or contents of each meaningful word included in the target document by providing a markup for meaning or contents attachment to each classified word based on the structure of the target document and data stored therein. Therefore, the document information processing apparatus can transmit an easy-to-understand document, which can inform a receiver about its meaning and in which the ambiguity in the meaning of each word or copula is eliminated, to the receiver.

Further objects and advantages of the present invention will be apparent from the following description of the preferred embodiments of the invention as illustrated in the accompanying drawings.

DETAILED DESCRIPTION OF THE PREFERRED EMBODIMENT

The preferred embodiment of the invention will now be described with reference to the accompanying drawings. A document information processing apparatus in accordance with the present invention can be implemented via software that can be incorporated into various information processors, such as a personal computer, a server computer, and a PDA.

Embodiment 1

Figure 1:
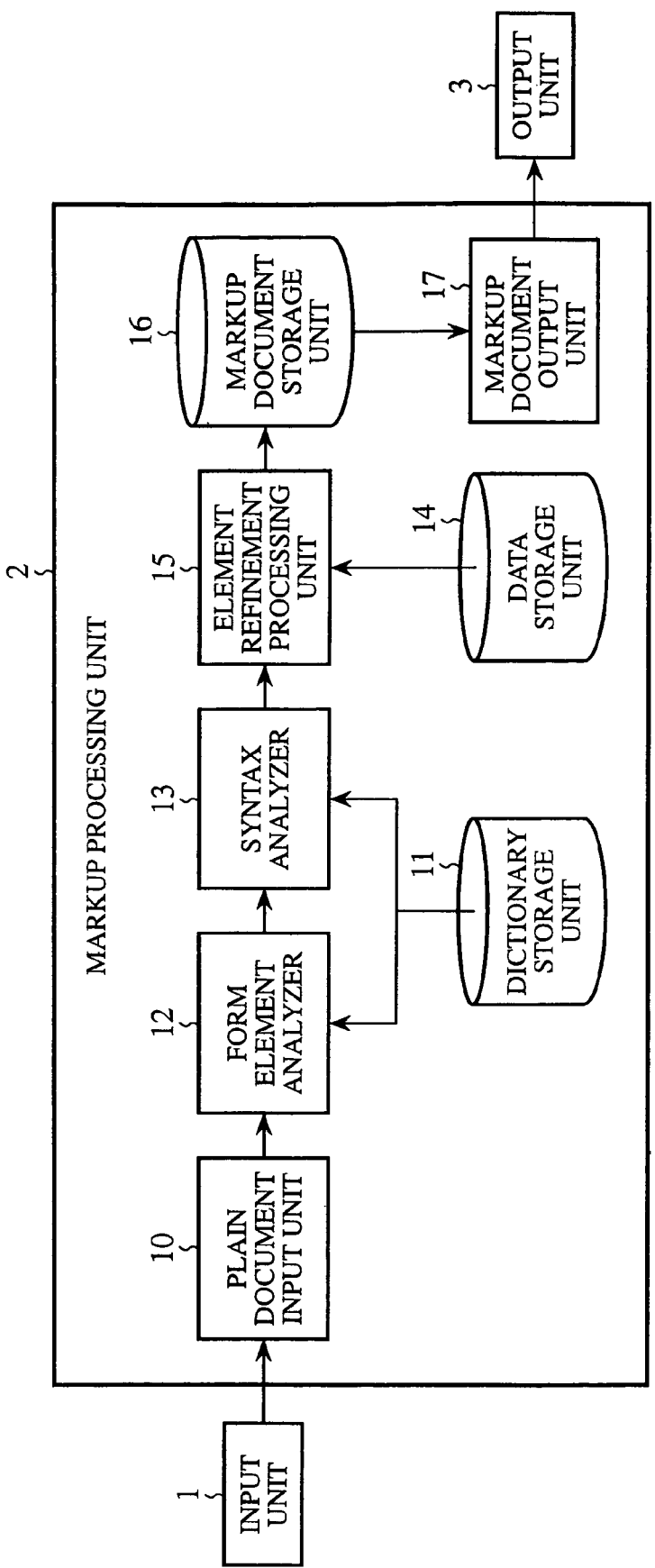
FIG. 1 is a block diagram showing the structure of a document information processing apparatus in accordance with embodiment 1 of the present invention.

FIG. 1 is a block diagram showing the structure of a document information processing apparatus in accordance with embodiment 1 of the present invention. This document information processing apparatus includes an input unit 1, a markup processing unit 2, and an output unit 3.

The input unit 1 can consist of an input device of an information processor with which the document information processing apparatus is built. This input unit 1 generates a plain document from a document of any one of various types, and sends it to the markup processing unit 2. The markup processing unit 2 generates a markup document that is a plain document to which markups are added, and sends the markup document to the output unit 3, as mentioned below in detail. The output unit 3 outputs the markup document sent from the markup processing unit 2.

The markup processing unit 2 includes a plain document input unit 10, a dictionary storage unit 11, a form element analyzer 12, a syntax analyzer 13, a data storage unit 14, an element refinement processing unit 15, a markup document storage unit 16, and a markup document output unit 17.

The plain document input unit 10 receives the plain document sent from the input unit 1, and sends it to the form element analyzer 12. The dictionary storage unit 11 stores a dictionary used for a form element analysis performed by the form element analyzer 12, and a dictionary used for a syntactic analysis performed by the syntax analyzer 13.

The form element analyzer 12 performs a form element analysis on the plain document received from the plain document input unit 10 while referring to the dictionaries stored in the dictionary storage unit 11 so as to decompose the plain document to tokens. A token is a character string that constitutes a minimum meaningful unit of a document. The data about the tokens into which the plain document is decomposed by the form element analyzer 12 are sent to the syntax analyzer 13. Since the process of decomposing the plain document into tokens which is performed by the form element analyzer 12 is well known, a detailed explanation of the decomposing process will be omitted in this specification.

The syntax analyzer 13 accepts the data about the tokens into which the plain document is decomposed by the form element analyzer 12 and performs a syntactic analysis of analyzing the part of speech of each of the tokens based on the syntax of the document while referring to the dictionaries stored in the dictionary storage unit 11 so as to generate data showing the document structure. This structured document includes meaningful words, such as position elements, time elements, proper noun elements, and act elements. In this specification, it is assumed that meaningful words include words and copulas. The structured document generated by the syntax analyzer 13 is then sent to the element refinement processing unit 15. Since the process of generating the structured document which is performed by the syntax analyzer 13 is well known, a detailed explanation of the generating process will be omitted in this specification.

The data storage unit 14 stores, as a database, various data used for the markup processing. The database formed in the data storage unit 14 is updated at any time based on both the data inputted from the input unit 1 and data about results obtained by the markup processing unit 2.

The element refinement processing unit 15 performs a markup process of adding data showing the meaning or contents of each meaningful word included in the structured document which is sent from the syntax analyzer 13 to each meaningful word so as to generate a structured markup document. The markup document generated by the element refinement processing unit 15 is sent to the markup document storage unit 16.

The markup document storage unit 16 stores the markup document sent from the element refinement processing unit 15. The markup document stored in the markup document storage unit 16 is read by the markup document output unit 17. The markup document output unit 17 reads the markup document stored in the markup document storage unit 16 and sends it to the output unit 3.

Hereafter, in order to understand the outline of the document information processing apparatus constructed as mentioned above, an explanation will be made as to a process of generating a markup document from a plain document, by taking a document of a preview release used for a product announcement as an example. The exemplary document of the preview release has a part enclosed by a quotation mark as follows:

"OO, Inc. has announced it will start marketing four models of DVD car-navigation systems including two car-navigation-industry's first models of "A series" that support Java (registered trademark) TM applications and two models of "B series" that are popularly priced, but offers high performance, from April 20."

When this preview release document is inputted to the markup processing unit 2 from the input unit 1, it is further delivered to the form element analyzer 12 by way of the plain document input unit 10. The form element analyzer 12 performs a form element analysis on the preview release document enclosed by a quotation mark while referring to the dictionaries stored in the dictionary storage unit 11 so as to decompose the preview release document into tokens, and outputs data about the tokens into which the preview release document is decomposed, as follows:

"/OO,/Inc./has/announced/it/will/start/marketing/four/ models/of/DVD/car-navigation/systems/including/two/car-navigation-industry's/first/models/of/"/A/series/"/that/support/Java (registered trademark)/™/applications/and/two/ models/of/"/B/series/"/that/are/popularly/priced/,/but/
offers/high/performance/,/from/April/20./"

The data about the tokens into which the preview release document is decomposed are sent from the form element analyzer 12 to the syntax analyzer 13. The syntax analyzer 13 receives the data from the form element analyzer 12, performs a syntactic analysis on the data while referring to the dictionaries stored in the dictionary storage unit 11, and outputs a structured document as shown in the following table 1.

TABLE 1

```
<Document Structure/>
<Subject/>OO, Inc.</Subject>
<Predicate/>has announced</Predicate>
<Object/>
    <Subject/>it</Subject>
    <Predicate/>will start marketing</Predicate>
    <Object/>four models of</Object>
    <Qualifier/>DVD car-navigation systems</Qualifier>
        <Predicate/>including</Predicate>
        <Object/>two car-navigation-industry's first models of</Object>
            <Qualifier/>"A series"</Qualifier>
            <Qualifier/>that support</Qualifier>
            <Qualifier/>Java (registered trademark)
```

TABLE 1-continued

```
            TM/applications</Qualifier>
        <Connection Word/>and</Connection Word/>
        <Object/>two models of</Object>
            <Qualifier/>"B series"</Qualifier>
            <Qualifier/>that are popularly priced,</Qualifier>
            <Qualifier/>but offers high performance,</Qualifier>
    <Qualifier/>from April 20.</Qualifier>
</Object>
</Document Structure>
```

The structured document generated by the syntax analyzer 13 is then sent to the element refinement processing unit 15. The element refinement processing unit 15 accepts the structured document from the syntax analyzer 13, and performs a process of adding markups to the structured document while referring to the database formed in the data storage unit 14 so as to generate a markup document in which a markup is added to each meaningful word, as shown in the following table 2. The markup document generated by the element refinement processing unit 15 is stored in the markup document storage unit 16.

TABLE 2

```
<Document/>
    <Subject/>OO, Inc.
        <Position/>
            <Latitude/>+35.676666</latitude>
            <Longitude/>+139.766666</longitude>
        </Position>
        <Peculiar Name/>
            <Title/>OO, Inc.
                <Ruby/>Marumaru Kabushikigaisha</Ruby>
                <Name/>MARUMARU INCORPORATION</Name>
            </Title>
            <Officer/>
                <URI/>
                    http://www.marumaru.co.jp/keireki/pdf/2001/p6.pdf
                </URI>
            </Officer>
            <Organization/>
                <URI/>
                    http://www.marumaru.co.jp/keireki/pdf/2001/p4.pdf
                </URI>
            </Organization>
            <Address/>
                <Zip code/>100-1234</Zip code>
                <Wide-area Local Self-governing Body/>Tokyo </Wide-area
                Local Self-governing Body>
                <Local Self-governing Body/>Chiyoda-ku</Local
                Self-governing Body>
                <Name of Town/>2-chome, Marunouchi</Name of Town>
                <Residence Indication/>2-3</Residence Indication>
            </Address>
            <Contact Address/>
                <URI/>http://www.marumaru.co.jp</URI>
                <TEL/>03-3218-****</TEL>
                <FAX/>03-3218-****</FAX>
            </Contact Address>
        </Peculiar Name>
    </Subject>
    <Predicate/>has announced
        <Act/></Act>
    </Predicate>
    <Object/>
        <Subject/>it</Subject>
        <Predicate/>will start marketing
            <Act/></Act>
        </Predicate>
        <Object/>four models of</Object>
            <Qualifier/>DVD car-navigation systems
```

TABLE 2-continued

```
            <Peculiar Name/></Peculiar Name>
        </Qualifier>
    <Predicate/>including</Predicate>
    <Object/>two car-navigation-industry's first models of </Object>
        <Qualifier/>"A series"
            <Peculiar Name/>
                <URI/> http://www.marumaru.co.jp/carele/carnavi/</URI>
            </Peculiar Name>
        </Qualifier>
        <Qualifier/>that support</Qualifier>
        <Qualifier/>Java (registered trademark) TM applications
            <Peculiar Name/>
                <URL/> http://www.sun.co.jp/software/java/</URL>
            </Peculiar Name>
    <Connection Word/>and</Connection Word/>
    <Object/>two models of</Object>
        <Qualifier/>"B series"
            <Peculiar Name/>
                <URI/> http://www.marumaru.co.jp/carele/carnavi/</URI>
            </Peculiar Name>
        </Qualifier>
        <Qualifier/>that are popularly priced,</Qualifier>
        <Qualifier/>but offers high performance,</Qualifier>
    <Qualifier/>from April 20.
        <Time/>
            <From/>
                <DATE/>2002-04-20</DATE>
            </From>
        </Time>
    </Qualifier>
    </Object>
</Document>
```

Thus, the element refinement processing unit 15 generates a markup document in which the markup process is performed on the meaning or contents of each meaningful word included in the structured document by adding a markup to each meaningful word. In the example as shown in Table 1 and Table 2 mentioned above, the markup of "OO, Inc." is to add attributes, such as "position", "title", "officer", "organization", "address", "contact address", to "OO, Inc.", and to carry out an addition of an explanatory note to each of the attributes or a meta-definition for each of the attributes. When the target of a markup is another object, each element can be defined as a URI (Uniform Resource Identifier) of the meta-definition.

Figure 2:
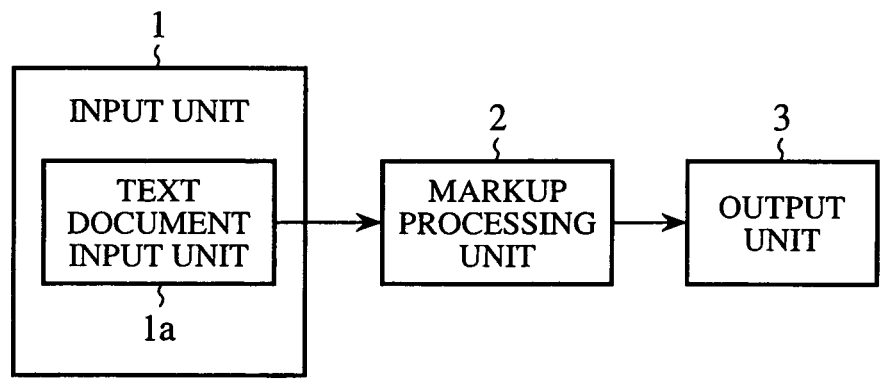
FIG. 2 is a block diagram showing the structure of a document information processing apparatus in accordance with a variant of embodiment 1 of the present invention.

The input unit 1 mentioned above can consist of a text document input unit 1a for inputting a plain document that is a text such as a preview release manuscript mentioned above, as shown in FIG. 2. The text document input unit 1a can be constructed of one of various devices capable of generating plain text documents, such as a keyboard or an external storage. The output unit 3 can consist of one of various devices capable of visualizing documents, such as a display unit or a printer. In this case, the output unit 3 can include an external communication output unit 3a that consists of, for example, communication equipment for transmitting the generated markup document to outside the document information processing apparatus, as shown in FIGS. 3 to 5.

Figure 3:
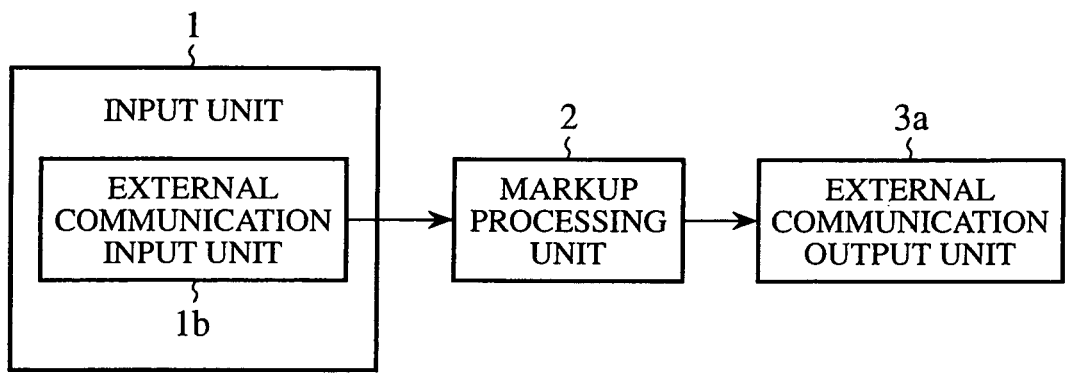
FIG. 3 is a block diagram showing the structure of a document information processing apparatus in accordance with another variant of embodiment 1 of the present invention.

The input unit 1 can include an external communication input unit 1b for inputting a plain document, such as a preview release manuscript mentioned above, from external communication equipment, as shown in FIG. 3. The output unit 3 can include an external communication output unit 3a consisting of, for example, communication equipment for transmitting the markup document to outside the document information processing apparatus.

Figure 4:
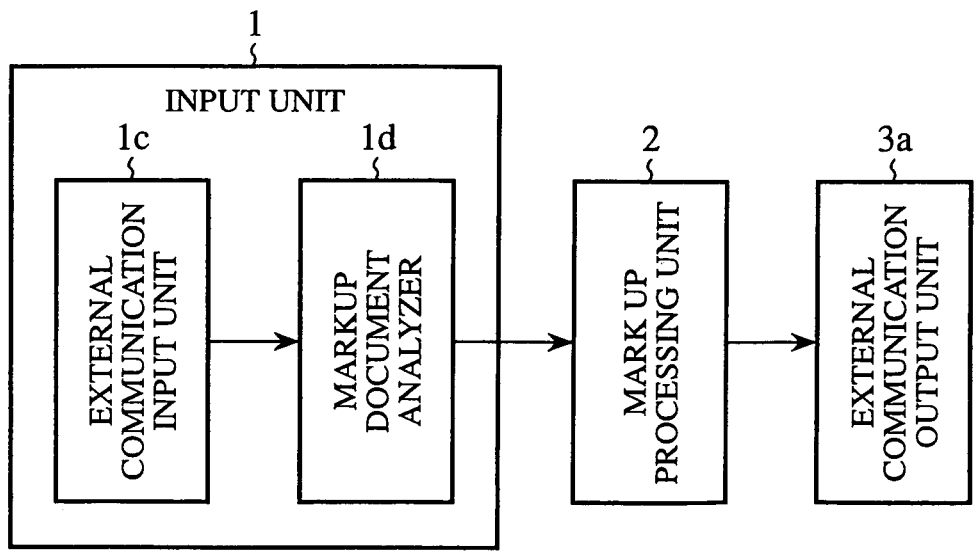
FIG. 4 is a block diagram showing the structure of a document information processing apparatus in accordance with a further variant of embodiment 1 of the present invention.

The input unit 1 can include, for example, an external communication input unit 1c for inputting a document on which a markup process is performed by using HTML (Hyper Text Markup Language), which is used for making home pages on the Internet, and a markup document analyzer 1d for analyzing the document from the external communication input unit 1c so as to remove markups from the input document and to generate a plain document, as shown in FIG. 4. The output unit 3 can include an external communication output unit 3a that consists of, for example, communication equipment for transmitting the generated markup document to outside the document information processing apparatus.

Figure 5:
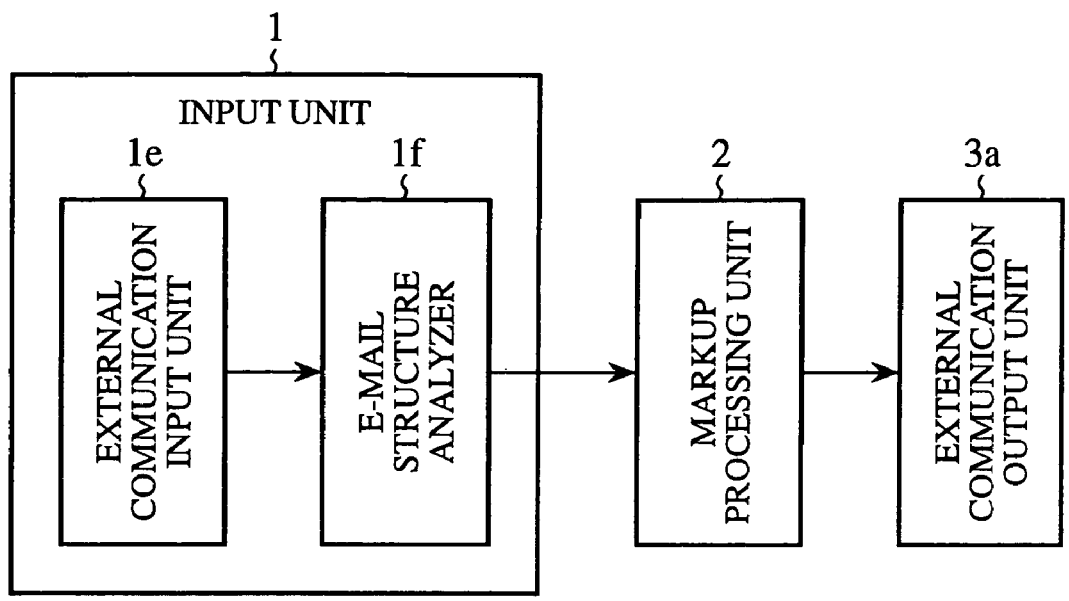
FIG. 5 is a block diagram showing the structure of a document information processing apparatus in accordance with a still further variant of embodiment 1 of the present invention.

As an alternative, the input unit 1 can include an external communication input unit 1e for inputting a structured document, such as an e-mail, and an e-mail structure analyzer 1f for analyzing the structure of the document inputted from the external communication input unit 1e, and for converting the document into a plain document while maintaining a relationship between a header and a body of the document, as shown in FIG. 5. The output unit 3 can include an external communication output unit 3a that consists of, for example, communication equipment for transmitting the generated markup document to outside the document information processing apparatus.

The header of an e-mail contains data, such as the protocol type (X-STMP-Result), the transmission date (Date), the addresser (From), the destination (To, CC, BCC), the title (Subject), the mail ID (Message-Id), the MIME type (MIME-Version:1.0), the type of e-mail software (X-Mailer), the priority (X-Priority), the priority (X-MS-Mail-Priority) of the message, the type (Content-Type) of the body, and the format (Content-Transfer-Encoding) of thebody.

The body is the main part of the message and is constructed of a plain document. The e-mail structure analyzer if determines whether or not the body is a text with reference to the type (Content-Type) of the body contained in the header, and, when determining that it is a text, outputs it just as it is a plain document, whereas, when determining that it is not a text, deletes markups included in the document, converts the document into a plain document, and outputs the plain document. The e-mail structure analyzer if stores information, such as the transmission date (Date), the addresser (From), the destination (To, CC, BCC), and the title (Subject), in the database formed in the data storage unit 14.

Now, imagine a case where a friend (Taro Yamada) will send a message "I am going to your home at tomorrow's 7:00 p.m." to me (Hanako Kawakami) at 20:00 on Dec. 25, 2002. In this case, Taro Yamada's e-mail address is indicated as the addresser in the header, Hanako Kawakami's e-mail address is indicated as the destination in the header, and 20:00 on Dec. 25, 2002 is indicated as the transmission date in the header.

When this e-mail is inputted into the form element analyzer 12 via the plain document input unit 10 after received by the external communication input unit 1e shown in FIG. 5 and changed to a plain document by the e-mail structure analyzer if, the form element analyzer 12 performs a form element analysis on the plain document while referring to the dictionaries stored in the dictionary storage unit 11, and outputs data about tokens into which the plain document is decomposed, the data being enclosed by a quotation mark as follows:

"/I/am/going/to/your/home/at/tomorrow's/7:00/p.m./"

The data about tokens into which the plain document is decomposed, which are outputted from the form element analyzer 12, are then sent to the syntax analyzer 13. The syntax analyzer 13 receives the data from the form element analyzer 12, performs a syntactic analysis on the received data while referring to the dictionaries stored in the dictionary storage unit 11, and outputs a structured document as shown in the following table 3.

TABLE 3

<Document Structure/>
    <Subject/>I</Subject>
    <Predicate/>am going</Predicate>
    <Complement/>
        <Qualifier/>to your home</Qualifier>
        <Qualifier/>at tomorrow's 7:00 p.m.</Qualifier>
    </Complement>
</Document Structure>

The structured document generated by the syntax analyzer 13 is then sent to the element refinement processing unit 15. The element refinement processing unit 15 accepts the structured document from the syntax analyzer 13 and performs a process of adding markups to the structured document so as to generate a markup document in which a markup process is performed on each meaningful word included in the structured document, as shown in the following table 4, while referring to the data stored in the data storage unit 14. The markup document generated by the element refinement processing unit 15 is then stored in the markup document storage unit 16.

TABLE 4

<Document/>
  <Subject/>I
    <Peculiar Name/>
      <Title/>Taro Yamada
        <Ruby/>Taro Yamada </Ruby>
        <Name/>TARO YAMADA </Name>
      </Title>
        <Address/>
            <Zip code/>100-1234</Zip code>
        <Wide-area Local Self-governing Body/>Tokyo</Wide-area Local Self-governing Body>
        <Local Self-governing Body/>Chiyoda-ku</Local Self-governing Body>
        <Name of Town/>2-chome, Marunouchi</Name of Town>
        <Residence Indication/>2-3</Residence Indication>
      </Address>
      <Contact Address/>
        <URI/>taro_yamada@malco.com</URI>
        <TEL/>03-3218-****</TEL>
        <FAX/>03-3218-****</FAX>
      </Contact Address>
    </Peculiar Name>
  </Subject>
  <Predicate/>am going
    <Act/></Act>
  </Predicate>
  <Complement/>
    <Qualifier/>to your home
      <Peculiar Name/>
        <Title/>Hanako Kawakami
          <Ruby/>Hanako Kawakami</Ruby>
          <Name/>HANAKO KAWAKAMI</Name>
        </Title>
        <Address/>
          <Zip Code/>669-5678</Zip Code>
          <Wide-area Local Self-governing Body/>Hyogo-ken</Wide-area Local Self-governing Body>
          <Local Self-governing Body/>Sanda-shi</Local Self-governing Body>
          <Name of Town/>2-chome, Miwa<Name of Town>
          <Residence Indication/>3-33</Residence Indication>
        </Address>
        <Contact Address/>
          <URI/>hanako_kawakami@malco.com</URI>
          <TEL/>079-559-****</TEL>

TABLE 4-continued

```
            <FAX/>079-559-****</FAX>
          </Contact Address>
        </Peculiar Name>
      </Qualifier>
      <Qualifier/>at tomorrow's 7:00 p.m.
          <Time/>
            <At/>
              <DATE/>2002-12-26T19:00Z</DATE>
            </At>
          </Time>
      </Qualifier>
    </Complement>
</Document>
```

Figure 6:
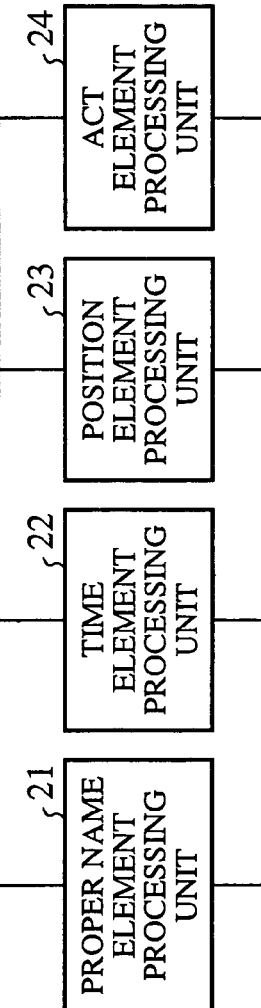
FIG. 6 is a block diagram showing the structure of an element refinement processing unit of the document information processing apparatus as shown in FIG. 1.

Thus, the document information processing apparatus performs a markup process on the meaning or contents of each meaningful word included in the message of the e-mail. In the example mentioned above, the markup of each meaningful word is to add data, such as "title", "address", and "contact address", as attributes of the subject specified in the message, and to provide an explanatory note or a meta-definition for each of the data. When the target of a markup is another object, each element can be defined as URI of a meta-definition. Next, the element refinement processing unit 15 which constitutes a part of the markup processing unit 2 mentioned above will be explained in detail. The element refinement processing unit 15 includes an element relation analyzer 20, a proper name element processing unit 21, a time element processing unit 22, a position element processing unit 23, an act element processing unit 24, and a data collection unit 25, as shown in FIG. 6.

A current position estimation unit 30, a time processing unit 31, and the data storage unit 14 mentioned above are connected to the data collection unit 25. The data collection unit 25 acquires data from the current position estimation unit 30, the time processing unit 31, and the data storage unit 14, and provides the data for processes to be performed by the proper name element processing unit 21, the time element processing unit 22, the position element processing unit 23, and the act element processing unit 24.

The current position estimation unit 30 estimates a document maker and the current position of each position element that appears in the document, and sends them to the data collection unit 25 of the element refinement processing unit 15. The time processing unit 31 computes a date corresponding to each time element (described later) based on the present date and sends the computed date to the data collection unit 25 of the element refinement processing unit 15.

Figure 7:
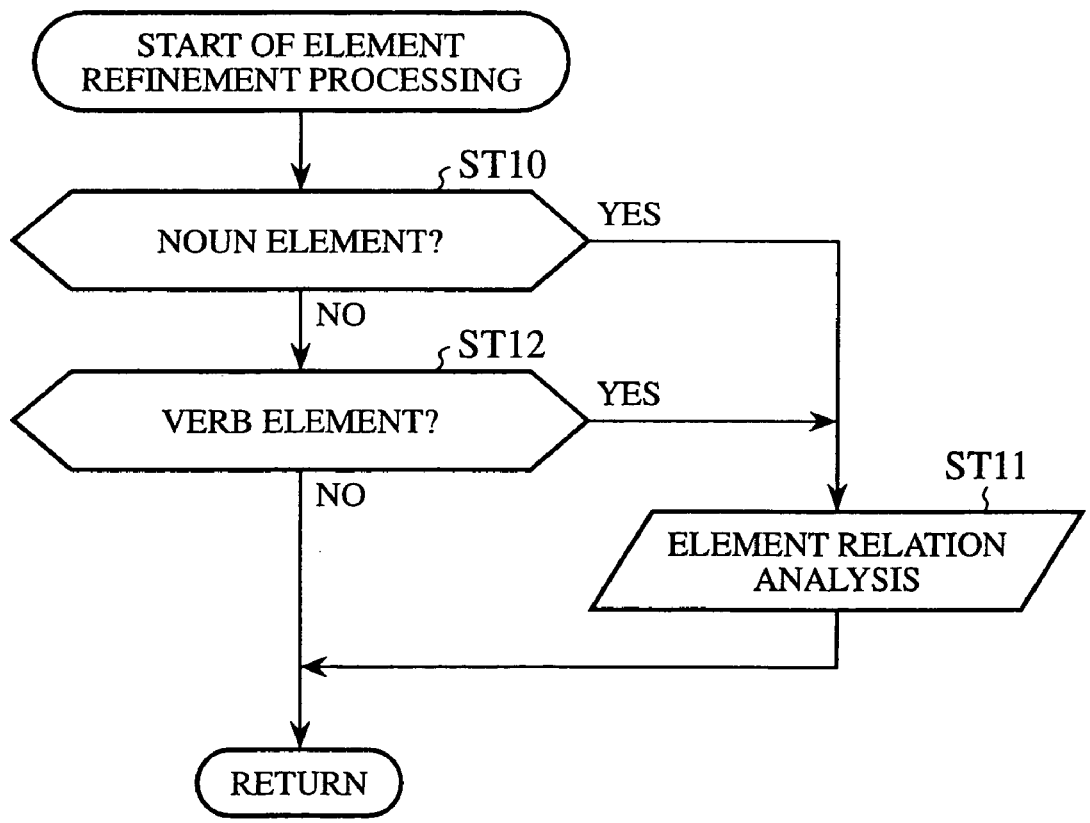
FIG. 7 is a flow chart showing processing performed by the element refinement processing unit as shown in FIG. 6.

The element refinement processing unit 15 performs processing on each of words contained in the document syntax-analyzed by and sent from the syntax analyzer 13 according to a procedure as shown in a flow chart of FIG. 7. In other words, the element refinement processing unit 15 checks to see whether or not each of the words contained in the document syntax-analyzed by and sent from the syntax analyzer 13 is a noun element (in step ST10). Then, when the element refinement processing unit 15 determines that the word in question is a noun element, the element relation analyzer 20 is started and carries out element relation analysis processing (in step ST11).

On the other hand, when determining that the word in question is not a noun element in above-mentioned step ST10, the element refinement processing unit 15 further checks to see whether or not the word in question is a verb element (in step ST12). Then, when the element refinement processing unit 15 determines that the word in question is a verb element, the element relation analyzer 20 is started and carries out element relation analysis processing (in step ST11). On the other hand, when determining that the word in question is not a verb element in step ST12, the element refinement processing unit 15 recognizes that the word in question is not a meaningful element, ends the processing on the word in question, and advances to the processing on the next word. The processing of steps ST10 to ST12 is repeated until the processing on all the words contained in the document syntax-analyzed by and sent from the syntax analyzer 13 is completed.

When the element refinement processing unit 15 determines that each of the words contained in the already-analyzed document is a noun or verb element, the element relation analyzer 20 further determines whether the word in question is any one of meaningful elements including a position element, a time element, a proper name element, or a verb element and performs processing on the word in question, the processing depending upon whether the word in question is any one of meaningful elements including a position element, a time element, a proper name element, or a verb element.

Figure 8:
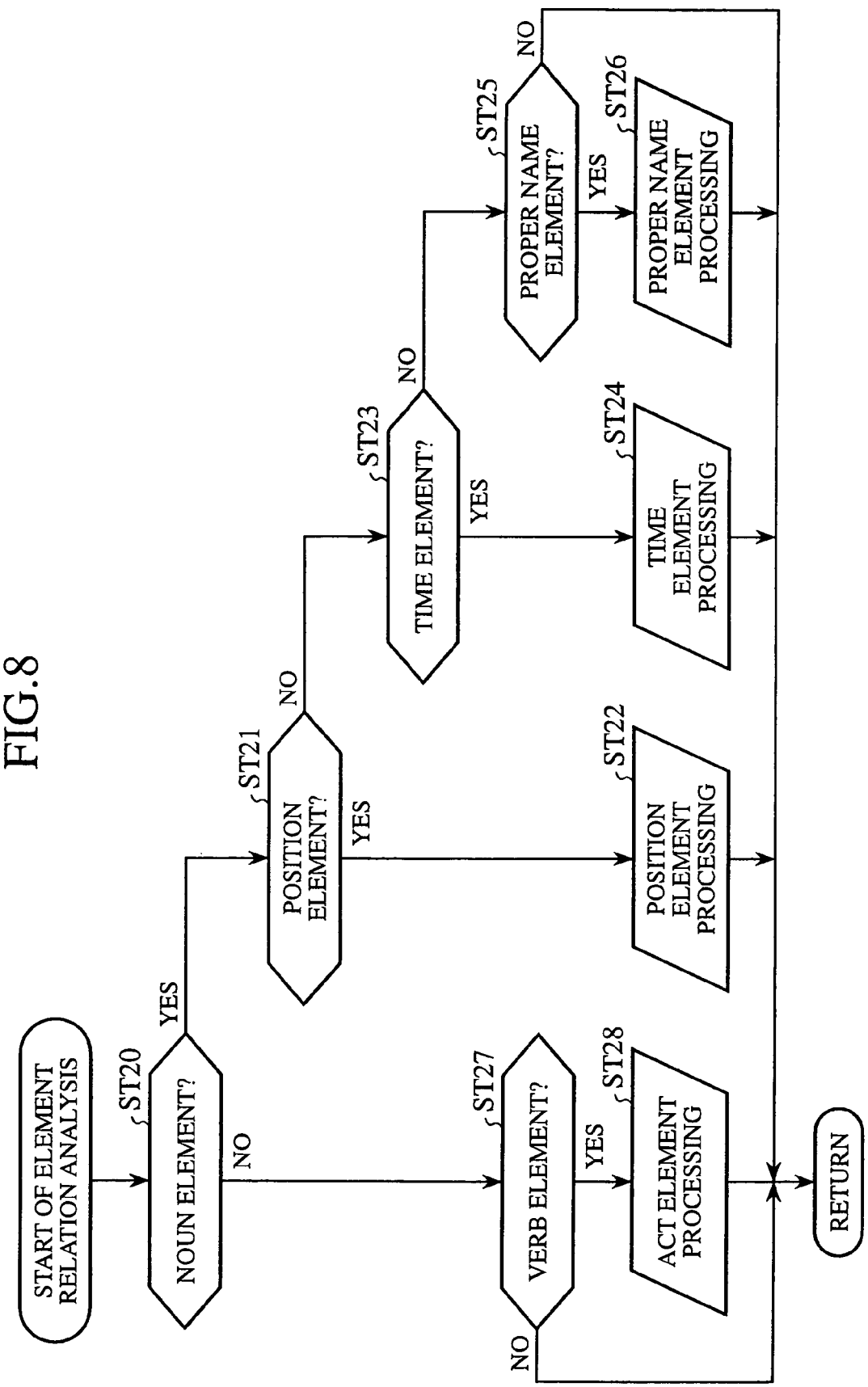
FIG. 8 is a flow chart showing processing performed by an element relation analyzer as shown in FIG. 6.

Concretely, the element relation analyzer 20 performs processing according to the procedure shown in the flow chart of FIG. 8. In other words, the element relation analyzer 20 checks to see whether each of the words contained in the already-analyzed document is a noun element first (in step ST20) When determining that each of the words is a noun element, the element relation analyzer 20 further checks to see whether or not the noun element is a position element (in step ST21). A position element includes a document maker's position and a position that appears in the document. When the element relation analyzer 20 determines that each of the words is a position element, the element refinement processing unit 15 enables the position element processing unit 23 to perform position element processing (in step ST22). After that, the sequence is returned to the above-mentioned processing by the element refinement processing unit 15.

When determining that each of the words is not a verb element in above-mentioned step ST21, the element relation analyzer 20 further checks to see whether or not the noun element is a time element (in step ST23). A time element includes the time of the creation of the document and a position that appears in the document. When the element relation analyzer 20 determines that each of the words is a time element, the element refinement processing unit 15 enables the time element processing unit 22 to perform time element processing (in step ST24). After that, the sequence is returned to the above-mentioned processing by the element refinement processing unit 15.

When determining that each of the words is not a time element in above-mentioned step ST23, the element relation analyzer 20 further checks to see whether or not the noun element is a proper name element (in step ST25). A proper name element includes a document maker's proper name and a proper name that appears in the document. When the element relation analyzer 20 determines that each of the words is a proper name element, the element refinement processing unit 15 enables the proper name element processing unit 21 to perform proper name element processing (in step ST26). After that, the sequence is returned to the above-mentioned processing by the element refinement processing unit 15. When determining that each of the words is not a proper name element in above-mentioned step ST25, the element relation analyzer 20 carries out a return of the sequence to the processing by the element refinement processing unit 15.

When determining that each of the words contained in the already-analyzed document is not a noun element in above-mentioned step ST20, the element relation analyzer 20 further checks to see whether or not each of the words is a verb element (in step ST27). When the element relation analyzer 20 determines that each of the words is a verb element, the element refinement processing unit 15 enables the act element processing unit 21 to perform act element processing (in step ST28). After that, the sequence is returned to the above-mentioned processing by the element refinement processing unit 15. When determining that each of the words is not a verb element in above-mentioned step ST27, the element relation analyzer 20 carries out a return of the sequence to the processing by the element refinement processing unit 15.

Figure 9:
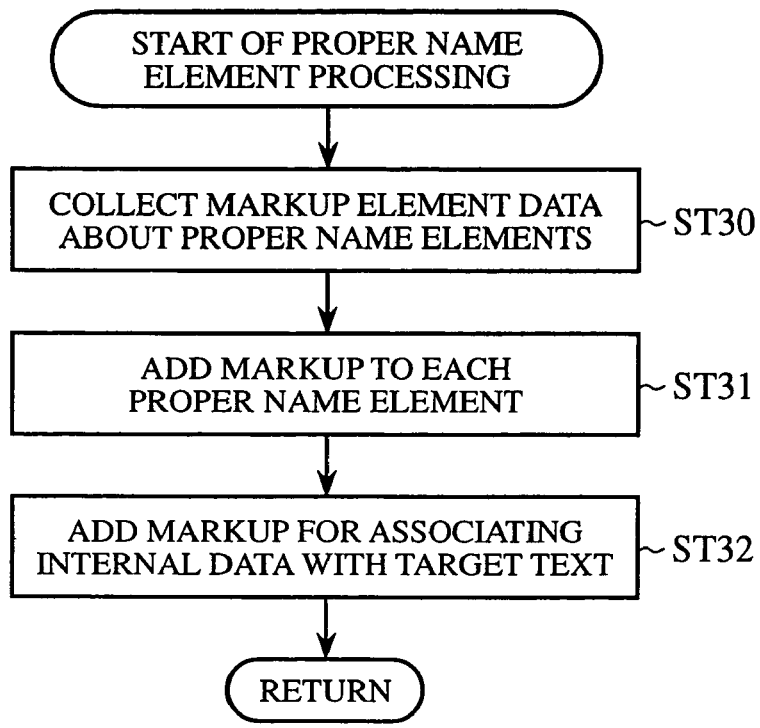
FIG. 9 is a flow chart showing processing performed by a proper name element processing unit as shown in FIG. 6.

The proper name element processing unit 21 performs the markup processing on each proper name element. Concretely, the proper name element processing unit 21 performs the processing according to a procedure shown in a flow chart of FIG. 9. In other words, the proper name element processing unit 21 collects markup element data about proper name elements first (in step ST30). Concretely, the proper name element processing unit 21 collects data associated with each proper name element from the database formed in the data storage unit 14 via the data collection unit 25.

The proper name element processing unit 21 then carries out a markup process on each proper name element (in step ST31) In other words, the proper name element processing unit 21 associates the data collected in above-mentioned step ST30 with each proper name element. The proper name element processing unit 21 then performs a markup process of associating internal data with this text (in step ST32). Concretely, the proper name element processing unit 21 incorporates the collected data as a markup into the document structure. Thereby, as shown in Table 2, as a markup of "OO, Inc.", "Position", "Title", "Officer", "Organization", "Address", "Contact address", etc., which are surrounded by a <Peculiar Name> tag, are incorporated with a tag being given to each of those elements. After that, the sequence is returned to the above-mentioned processing by the element relation analyzer 20.

Figure 10:
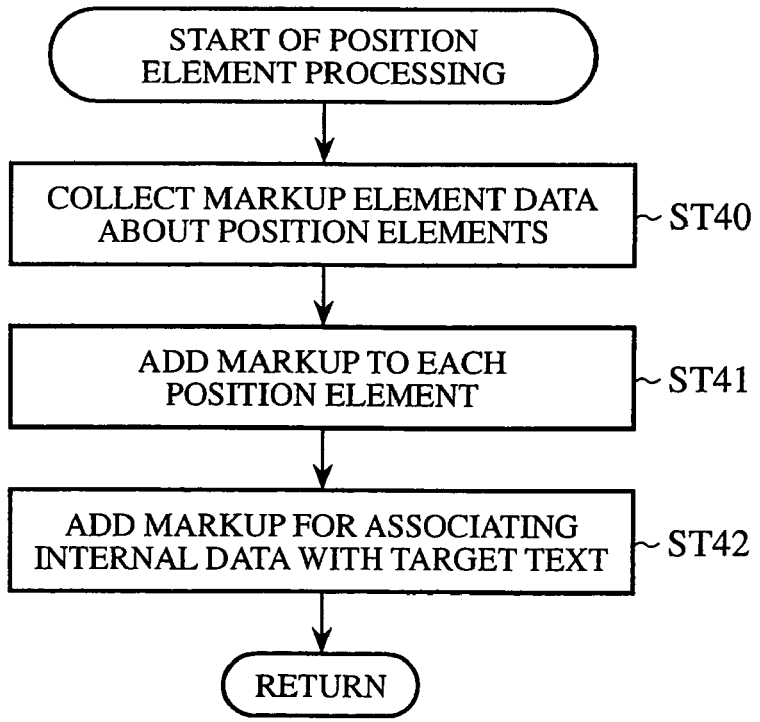
FIG. 10 is a flow chart showing processing performed by a position element processing unit as shown in FIG. 6.

The position element processing unit 23 performs a markup process on each position element. Concretely, the position element processing unit 23 performs the markup processing according to a procedure shown in a flow chart of FIG. 10. In other words, the position element processing unit 23 collects markup element data about each position element first (in step ST40). Concretely, the position element processing unit 23 acquires the current position corresponding to each position element from the current position estimation unit 30 by way of the data collection unit 25, and further collects data associated with the acquired current position from the database formed in the data storage unit 14 by way of the data collection unit 25.

The position element processing unit 23 then carries out a markup process on each position element (in step ST41). In other words, the position element processing unit 23 associates the data collected in above-mentioned step ST40 with each position element. The position element processing unit 23 then performs a markup process of associating internal data with this text (in step ST42). Concretely, the position element processing unit 23 incorporates the collected data as a markup in the text document structure. Thereby, as shown in Table 2, as a markup of "OO, Inc.", "Longitude", "Latitude", etc., which are surrounded by a <Position> tag, are incorporated with a tag being given to each of those elements. After that, the sequence is returned to the above-mentioned processing by the element relation analyzer 20.

Figure 11:
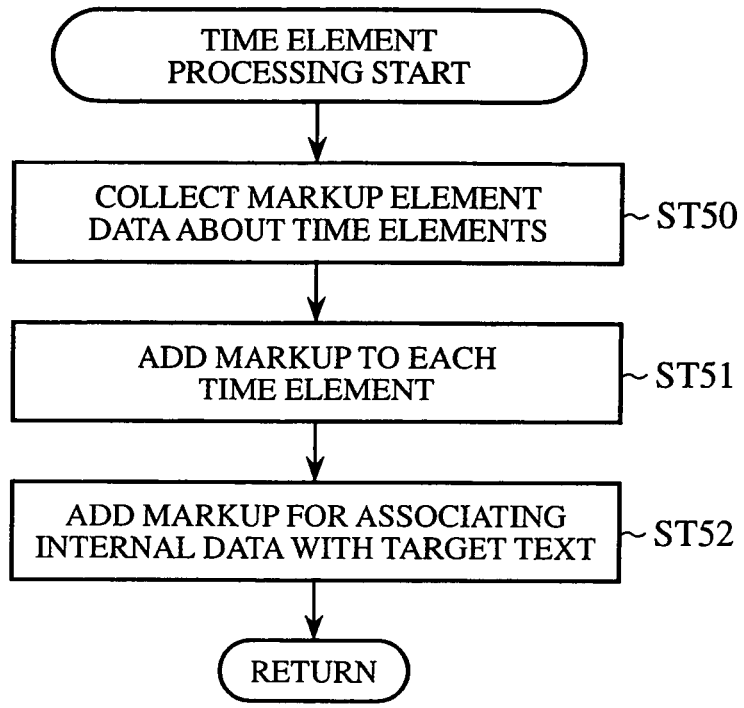
FIG. 11 is a flow chart showing processing performed by a time element processing unit as shown in FIG. 6.

The time element processing unit 22 performs a markup process on each time element. Concretely, the time element processing unit 22 performs the processing according to a procedure shown in a flow chart of FIG. 11. In other words, the time element processing unit 22 collects markup element data about each time element first (in step ST50). Concretely, the time element processing unit 22 acquires a date corresponding to each time element from the time processing unit 31 by way of the data collection unit 25.

The time element processing unit 22 then carries out a markup process on each time element (in step ST51). In other words, the time element processing unit 22 associates the data collected in above-mentioned step ST50 with each time element. The time element processing unit 22 then performs a markup process of associating internal data with this text (in step ST52). Concretely, the time element processing unit 22 incorporates the acquired date as a markup in the text document structure. Thereby, as shown in Table 2, as a markup of "at tomorrow's 7:00 p.m.", "2002-12-26T19:00Z" or the like, which is surrounded by a <Time> tag, is incorporated with a tag being given to the element. After that, the sequence is returned to the above-mentioned processing by the element relation analyzer 20.

Figure 12:
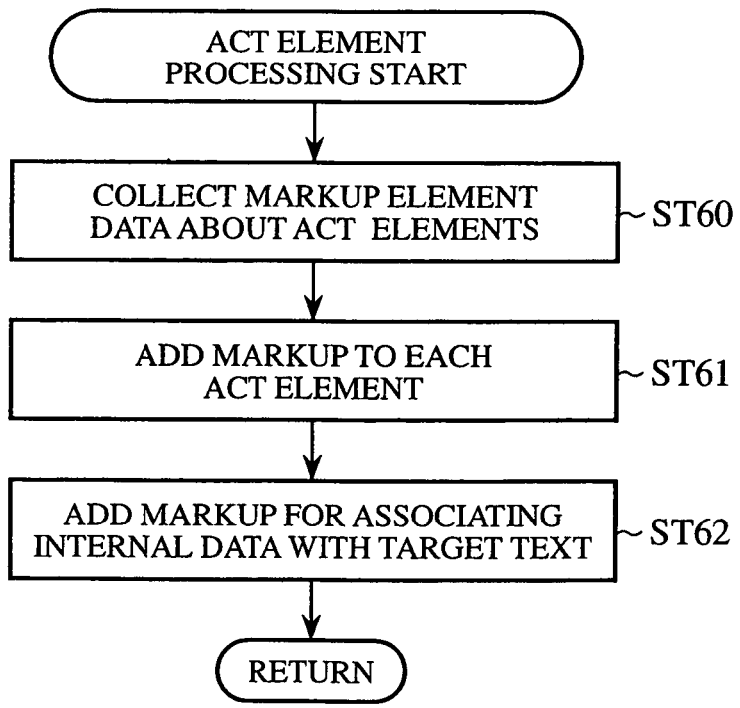
FIG. 12 is a flow chart showing processing performed by an act element processing unit as shown in FIG. 6.

The act element processing unit 24 performs a markup process on each act element. Concretely, the act element processing unit 24 performs the processing according to a procedure shown in a flow chart of FIG. 12. In other words, the act element processing unit 24 collects markup element data about each act element first (in step ST60). Concretely, the act element processing unit 24 collects data associated with each act element from the database formed in the data storage unit 14 by way of the data collection unit 25.

The act element processing unit 24 then carries out a markup process on each act element (in step ST61). In other words, the act element processing unit 24 associates the data collected in above-mentioned step ST60 with each act element. The act element processing unit 24 then performs a markup process of associating internal data with this text (in step ST62). Concretely, the act element processing unit 24 incorporates the collected data as a markup in the text document structure. Thereby, as shown in Table 4, as a markup of "am going", an empty element surrounded by an<Act> tag is incorporated. After that, the sequence is returned to the above-mentioned processing by the element relation analyzer 20.

As previously explained, the document information processing apparatus in accordance with this embodiment 1 can decompose one of various types of alphabetic information or a document into words (or copulas) and can classify each of these words according to its part of speech. Then the document information processing apparatus in accordance with this embodiment 1 can automatically add the meaning or contents of each meaningful word included in a target document by providing a markup for meaning or contents attachment to each classified word based on the structure of the target document and a database stored in an information equipment terminal. Therefore, the document information processing apparatus in accordance with this embodiment 1 can transmit an easy-to-understand document, which can inform a receiver about its meaning and in which the ambiguity in the meaning of each word or copula is eliminated, to the receiver. As a result, users can smoothly provide their intentions to receivers by using alphabetic information.

The meaning or contents of a word or copula on which a markup process is performed can represent not only a part of a document but also an object, such as a voice or an image. Therefore, the document information processing apparatus in accordance with this embodiment 1 enables users to smoothly provide their intentions to receivers at the time of exchange of one of various types of alphabetic information or a document.

In accordance with above-mentioned embodiment 1, the document information processing apparatus is disposed in an information processing apparatus, as previously explained. The document information processing apparatus can be implemented via independent hardware, as a matter of course.

Many widely different embodiments of the present invention may be constructed without departing from the spirit and scope of the present invention. It should be understood that the present invention is not limited to the specific embodiments described in the specification, except as defined in the appended claims.

What is claimed is:

1. A document information processing apparatus comprising:
   a plain document input unit for inputting a plain document;
   a dictionary storage unit for storing a dictionary used for form element analysis and syntactic analysis;
   a form element analyzer for performing a form element analysis on the plain document inputted from said plain document input unit by using the dictionary stored in said dictionary storage unit so as to decompose the plain document into tokens;
   a syntax analyzer for analyzing a part of speech of each of the tokens obtained by said form element analyzer based on a syntax of said plain document so as to generate a structured document containing meaningful words;
   a data storage unit for storing data used for a markup process;
   an element refinement processing unit for performing the markup process of reading each of the meaningful words in the structured document and automatically adding content to the structured document in association with at least one of the meaningful words in order to generate a markup document; and
   a markup document output unit for outputting the markup document generated by said element refinement processing unit,
wherein
   the added content is different from the markup tags in the markup document, and
   the added content includes at least one of:
      data, which is related to at least one of the meaningful words and which is read from the data storage unit, and
      data, which is related to at least one of the meaningful words and which is generated according to a determined attribute of the at least one of the meaningful words.

2. The document information processing apparatus according to claim 1, wherein said apparatus further includes a text document input unit for generating a plain text document and sending the generated plain text document to said plain document input unit.

3. The document information processing apparatus according to claim 2, wherein said apparatus further includes an external communication output unit for sending the markup document from said markup document output unit to an external device.

4. The document information processing apparatus according to claim 1, wherein said apparatus further includes an external communication input unit for inputting a plain document from outside said apparatus via a communication device, and sends the inputted plain document to said plain document input unit.

5. The document information processing apparatus according to claim 4, wherein said apparatus further includes an external communication output unit for sending the markup document from said markup document output unit to an external device.

6. The document information processing apparatus according to claim 1, wherein said apparatus further includes an external communication input unit for inputting a document on which a markup process has been performed from outside said apparatus via a communication device, and a markup document analyzer for analyzing and removing markups from the document inputted by said external communication input unit so as to generate a plain document to be sent to said markup document input unit.

7. The document information processing apparatus according to claim 6, wherein said apparatus further includes an external communication output unit for sending the markup document from said markup document output unit to an external device.

8. The document information processing apparatus according to claim 1, wherein said apparatus further includes an external communication input unit for inputting an e-mail from outside said apparatus via a communication device, and an e-mail structure analyzer for analyzing a structure of the e-mail from said external communication input unit so as to generate a plain document, and for sending the generated plain document to a markup document input unit.

9. The document information processing apparatus according to claim 8, wherein said apparatus further includes an external communication output unit for sending the markup document from said markup document output unit to an external device.

10. The document information processing apparatus according to claim 1, wherein said element refinement processing unit includes an element relation analyzer for automatically classifying at least one of the meaningful words as a meaningful element, the meaningful element indicating a meaning or attribute of the corresponding meaningful word.

11. The document information processing apparatus according to claim 10, wherein said apparatus further includes a proper name element processing unit for adding a markup to a proper name element indicating a proper name, and said element relation analyzer initiates operation of said proper name element processing unit when the meaningful element is determined to be a proper name element.

12. The document information processing apparatus according to claim 10, wherein said apparatus further includes a time element processing unit for adding a markup to a time element indicating a time, and said element relation analyzer initiates operation of said time element processing unit when the meaningful element is determined to be a time element.

13. The document information processing apparatus according to claim 12, wherein said apparatus further includes a time processing unit for computing a date corresponding to a time element, and said time element processing unit adds the date from said time processing unit, as a markup, to the time element.

14. The document information processing apparatus according to claim 10, wherein said apparatus further includes a position element processing unit for adding a markup to a position element indicating a position, and said element relation analyzer initiates operation of said position element processing unit when the meaningful element is determined to be a position element.

15. The document information processing apparatus according to claim 14, wherein said apparatus further includes a current position estimation unit for estimating a current position corresponding to the position element, and said position element processing unit adds the current position from said current position estimation unit, as a markup, to the position element.

16. The document information processing apparatus according to claim 10, wherein said apparatus further includes an act element processing unit for adding a markup to an act element indicating an act, and said element relation analyzer initiates operation of said act element processing unit when the meaningful element is determined to be an act element.

17. The document information processing apparatus according to claim 1, wherein the element refinement processing unit determines an attribute of the at least one meaningful word, and adds a markup tag to the structured document identifying the attribute, the added content being associated with the markup tag.

18. The document information processing apparatus according to claim 17, wherein the added content is at least one of a definition, a Uniform Resource Identifier (URI) of a stored definition, or explanatory data relating to the attribute.

19. The document information processing apparatus according to claim 18, wherein the added content is obtained from a database entry in the data storage unit associated with the at least one meaningful word.

20. The document information processing apparatus according to claim 17, wherein the added content indicates a current position or date associated with the attribute.

21. The document information processing apparatus according to claim 17, wherein the determined attribute is classified as one of the following elements associated with the at least one meaningful word: a proper name element, a position element, a time element, and a verb element.

* * * * *